United States Patent [19]

Knapp

[11] Patent Number: 4,932,433

[45] Date of Patent: Jun. 12, 1990

[54] MECHANISM TO COVER AND PROTECT THE INTERNAL OPERATING PARTS OF FAUCETS OPERATED BY A SINGLE BIDIRECTIONAL CONTROL LEVER

[75] Inventor: Alfons Knapp, Biberach an der Riss, Fed. Rep. of Germany

[73] Assignee: Masco Corporation, Taylor, Mich.

[21] Appl. No.: 341,097

[22] PCT Filed: Jun. 30, 1988

[86] PCT No.: PCT/US88/02198

§ 371 Date: Feb. 28, 1989

§ 102(e) Date: Feb. 28, 1989

[30] Foreign Application Priority Data

Jul. 1, 1987 [IT] Italy ................................ 67564 A/87

[51] Int. Cl.$^5$ ............................................. F16K 27/08
[52] U.S. Cl. ..................................... 137/381; 137/382; 137/625.41
[58] Field of Search ............ 137/377, 381, 382, 625.41

[56] References Cited

U.S. PATENT DOCUMENTS

| | | | |
|---|---|---|---|
| 2,216,040 | 10/1972 | Schweiz. | |
| 2,675,018 | 4/1954 | Hudson et al. | 137/381 |
| 2,911,009 | 11/1959 | Parker | 137/625.41 |
| 3,156,260 | 11/1964 | Harvey et al. | 137/625.41 |
| 3,422,849 | 1/1969 | Manoogian | 137/625.41 |
| 3,872,890 | 3/1975 | Hare | 137/625.41 |
| 4,226,260 | 10/1980 | Schmitt | 137/315 |

*Primary Examiner*—A. Michael Chambers
*Attorney, Agent, or Firm*—Steven L. Permut; Malcolm L. Sutherland

[57] ABSTRACT

A mechanism for covering and protecting operating parts of a mixing faucet that has a bidirectional control lever 10 which extends through an opening in its cover 11 and moves about a single center. A semi-spherical surface 11a of the cover abuts a thin semi-spherical cap 15 having an exterior and interior surface 15a and 15b having the same center of rotation as the lever. The cover is semi-spherical surface substantially corresponds to the semi-spherical cap's interior surface. The semi-spherical cap 15 covers the opening 10 and is able to slide over the semi-spherical surface of the cover due to its identical spherical curvature. Structurally the cap is separate from the control lever and is transverse to it. The cap 15 makes contact with a rim of the window 17 of an outer hood 16. The hood 16 is mounted about the cover 11 and able to slide thereagainst and into the space underneath the hood. Cap 15 and the hood 16 can be economically produced and mounted onto the valve. The cap and hood can be made from plastic materials or molded metallic laminates.

10 Claims, 1 Drawing Sheet

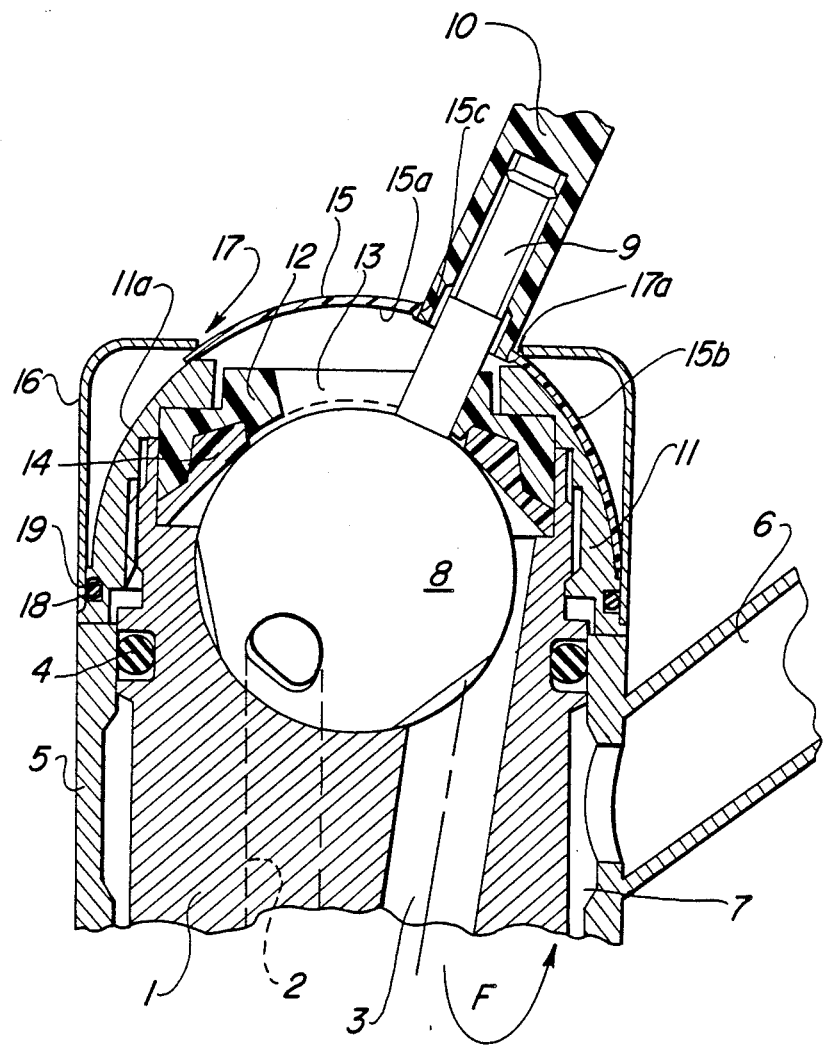

MECHANISM TO COVER AND PROTECT THE INTERNAL OPERATING PARTS OF FAUCETS OPERATED BY A SINGLE BIDIRECTIONAL CONTROL LEVER

TECHNICAL FIELD

The present invention is directed to a mechanism for covering and protecting internal operating parts of a mixing faucet having a movable control lever which pivotally moves about a single center.

BACKGROUND OF THE INVENTION

In faucets that have a single control handle, movement of the control lever in one of the directions regulates the proportion of mixing of cold and hot water which arrives at the faucet through its respective inlets, while the movement of the same control lever in another direction regulates the total flow of the mixed water supplied to the faucet. Because the control lever is movable in two different directions, the window from which the lever of the valve body cover extends is relatively large to allow motion of the lever in both directions. The window or opening can constitute an unsightly element where dirt, grease, small objects and other unwanted material can easily penetrate into the valve body causing its malfunction.

Often the opening is hidden from view by a control lever that has an integral bottom flange or cap at its base. However, the bottom of the control lever is not sufficient to effectively protect the internal machinery because there is a wide gap between the bottom flange and the cover which permits dirt to easily penetrate to the movable parts. Furthermore, both the bottom flange and a portion of the cover not covered by this integral flange are visible which either compromises or restricts the appearance of the faucet and puts narrow limits on the refinement of its design. The cover often has a finished exterior surface which increases the production expense of this particular mechanism.

What is needed is a more efficient mechanism for covering and protecting the internal operating parts of a faucet of the type considered here. An improvement is needed that minimizes design limitations affecting the faucet's appearance, and permits a more efficient construction while substantially reducing its cost.

SUMMARY OF THE INVENTION

One aspect of the invention involves a mixing faucet with a bidirectional movable control lever pivotally movable about a single point and extending from an opening formed within a cover. One part of the cover has an exterior semi-spherical surface centered about the same point as the lever's center of movement. A thin semi-spherical cap with a complementary internal semi-spherical surface is placed over the cover and makes contact with the exterior semi-spherical surface. The cap is separate from the control lever and mounted transverse to the axis of the lever. A hood is mounted over the cover and the outer periphery of said cap. The hood has a circular window sized to be in sliding contact with the external surface of the cap.

The cap and hood protect and cover the opening in the cover regardless of the position of the control lever. The thin semi-spherical shaped cap is constructed as a separate member from the control lever and is mounted to be in direct contact with the underlying spherical section of the cover. Therefore, besides covering up the hood window, the cap protects and successfully seals the cover opening against dirt and other unwanted material from entry. This sealing effect is even more efficient due to the fact that the cap is in sliding contact with the circular window of the hood (that is, it touches the edges of the window), resulting in two efficient closures in a row. The capped unit hides all internal parts of the faucet, and the cover is mounted under the cap. Only a small portion of the cap is visible from the window in the hood so that the presence of the cap only minimally affects the appearance of the faucet which can be designed with great freedom. Finally, the cap and hood can be produced very economically; for example, in plastic or in molded metallic laminate with finishing touches and different designs desired to meet the different aesthetic possibilities adopted for the faucet. The cover need no longer be finished which can substantially reduce the cost of production of the whole assembly.

BRIEF DESCRIPTION OF THE DRAWING

The invention can be better understood by reference to the accompanying drawing which shows a fragmentary and sectional view showing a preferred embodiment of a faucet.

DETAILED DESCRIPTION OF THE PREFERRED EMBODIMENT

With reference to the drawing, the faucet represented is made up of the fixed body 1 in which there are hot and cold water inlets 2 (only one of which is represented by dash lines because they are not in the same plane as the section represented), and also a mixed water outlet 3. A spout base (or lower covering) 5 is mounted on the body held by an O-ring 4 which can be fixed or rotatable with respect to the fixed body. The spout 6 is connected to the spout base 5. The space 7 between the spout base 5 and body 1 communicates with the outlet 3 (as shown by arrow F) in such a manner that mixed water arrives at the spout 6.

Within the body there is a partially spherical socket in which a ball valve 8 is located, and the ball valve 8 has a stem 9 which extends to the control lever 10. A cover 11, having a semi-spherical exterior surface 11a is screwed onto the body 1 and engages a ferrule 12 which has an opening 13 that receives the arm 9 of the ball valve 8. A gasket or seal 14, held by the ferrule 12 and sealingly abutting the ball valve prevents leakage and keeps the ball valve 8 in correct operating position.

The above described parts are generally present in all faucets with ball valves of the type considered. The control lever 10 is movable within the opening 13 in such a way to independently regulate the total flow of mixed water passing through outlet 3, and the proportion of hot and cold water which comes from the two inlets 2.

A covering cap 15 in the form of a thin semi-spherical cap has an inner surface 15a which slidably abuts against the exterior semi-spherical surface 11a of cover 11. The cap 15 is a separate member mounted about the control lever 10 and placed transverse with respect to it about the central opening 15c. A hood 16 is mounted about the cover 11 and held there by the friction of an O-ring seal 18. The hood 16 has a circular window 17 wherein the inner edge 17a of the hood defining the window 17 touches the external surface 15b of the thin semi-spherical cap 15. Outside of the necessary constraints of this window 17, the shape of the hood 16 can be a cylinder rounded at its upper end to a planar top. However, great liberty of design beyond the periphery of the window 17 is possible with other shapes being used if desired.

The semi-spherical cap 15 is sufficiently sized to cover and block both opening 13 and window 17 completely, regardless of the position of the control lever. The blockage of both the opening 13 and window 17 is very efficient from the point of view of its capacity for protection. The semi-spherical cap 15 is free to make direct contact at its interior surface to the semi-spherical surface 11a of the cover 11 and at its exterior with the edge or rim 17a of window 17 of the hood 16 without requiring any special precision of manufacturing. Only a limited central portion of the thin semi-spherical cap 15 is visible through window 17, while the peripheral portion of the cap 15 and all of cover 11 are completely hidden under the hood 16. The concealing of cover 11 and most of cap 15 provides the capacity to design the faucet with very few technical limitations. Since the cover 11 is hidden, it does not require any refinements to its appearance, therefore greatly reducing its production costs.

The thin cap 15 can be economically manufactured in various materials and colors for the various versions of the faucet; these materials can be plastics or also metallic plastic. Otherwise, the thin cap 15 can be made of a molded metallic laminate coated by plating or enameled.

Furthermore, the hood 16 can be economically produced, for example, in molded laminate which can also be coated by plating, glazing or enameling, or can be made of plastic material which can have various colors or coated with a metallic glaze.

The joining of the hood 16 by the friction generated by the O-ring seal 18 is sufficient, because the hood is not subject to any force, but it is also possible to snap fit the hood 16 into place with internal catches which will spring back into place in the groove 19 which, as shown in the drawing, contains the O-ring seal 18. A variety of other means of connection between the hood 16 and the cover 11 can be adopted.

As represented in the drawing, the control lever 10 can freely extend through the central hole 15c in the thin cap 15 which is held in position only by the hood 16. The hole 15c is sized to abut the lever 10 so no gap exists therebetween. Alternatively, the control lever 10 can be provided with a small reinforcement at its base capable of holding the thin cap 15 in place.

The embodiment shown is the upper part of a single lever mixing faucet operated by a ball valve. The invention has been described with reference to this specific type of faucet for reasons of clarity, but it should be understood that the nature of the internal faucet components does not affect in any way the application of the invention. It can therefore be applied to any type of faucet with a bidirectional control lever that is pivotably movable about a single center. Consequently, the invention can apply to any control lever connected to a ball valve or also to a lever which controls any other valve mechanism inside the faucet.

Variations and modifications of the present invention are possible without departing from the scope and spirit as defined in the appended claims.

I claim:

1. A mechanism to cover and protect the internal operating parts of a mixing faucet including an operable control lever which extends through an opening located within a cover element which has a semi-spherical exterior surface, said mechanism characterized by:
   a thin semi-spherical cap with an internal surface complementary to the semi-spherical exterior surface of the cover and abutting thereagainst; said cover being structurally separate from the control lever and substantially transverse to it;
   a hood mounted about said semi-spherical exterior surface of said cover and partially enclosing said cap; said hood having a circular window with the periphery of said window abutting the external surface of the cap.

2. A mechanism according to claim further characterized by the semi-spherical cap held in its operating position by means of said hood.

3. A mechanism according to claim 1 wherein the cap has an opening which receives a control lever therethrough and sized such that the cap member abuts the control lever.

4. A mechanism according to claim 1 further characterized by the semi-spherical cap held in its operating position by means of a reinforcement at the base of the control lever.

5. A mechanism according to claim 1 further characterized by the cap being made out of plastic material.

6. A mechanism according to claim characterized by said cap being made out of molded laminate that is plated or enameled.

7. A mechanism according to claim further characterized by said hood being made out of molded laminate that is coated by plating, glazing or enameling.

8. A mechanism according to claim 1 further characterized by said hood being made out of plastic material.

9. A mechanism according to claim 1 further characterized by said hood being mounted in operating position by the friction of an O-ring seal interposed between the cover or body of the faucet and the hood.

10. A mechanism according to claim 1 further characterized by said hood being mounted in operating position by means of elevations engaged in the body of the faucet.

* * * * *